United States Patent [19]

Simokat

[11] 4,062,054

[45] Dec. 6, 1977

[54] MULTI-FUNCTION FAIL-SAFE ARRANGEMENTS FOR OVERVOLTAGE GAS TUBES

[75] Inventor: Frank L. Simokat, Babylon, N.Y.

[73] Assignee: TII Corporation, Lindenhurst, N.Y.

[21] Appl. No.: 719,076

[22] Filed: Aug. 31, 1976

[51] Int. Cl.$^2$ .............................................. H02H 3/22

[52] U.S. Cl. ...................................... 361/119; 337/18; 337/32; 361/120; 361/124

[58] Field of Search ............... 361/119, 120, 124, 125, 361/129; 337/15, 17, 18, 31, 32, 33

[56] References Cited

U.S. PATENT DOCUMENTS

| | | | |
|---|---|---|---|
| 3,281,625 | 10/1966 | Wanaselja | 361/120 |
| 3,340,431 | 9/1967 | Wanaselja | 361/120 |
| 3,522,570 | 8/1970 | Wanaselja | 337/17 |
| 3,896,343 | 7/1975 | Baker et al. | 361/120 |

*Primary Examiner*—Harry E. Moose, Jr.

*Attorney, Agent, or Firm*—Morgan, Finnegan, Pine, Foley & Lee

[57] ABSTRACT

Disclosed herein are gas tube arrestor configurations employing multiple-function fail-safe elements which coact with the gas tube arrestor to define both a fusible path for fail-safe shorting and grounding of the arrestor in the event of certain forms of excessive overloads, as well as ionization gaps to provide backup overvoltage protection in the event of gas tube failure. In the illustrated embodiments, annular fusible rings are coaxially coupled to the gas tube housing in such a way as to provide, when fused, a short circuit connection between electrodes, the fusible rings also including pole face sections for defining an ionizable gap which functions as a backup air gap protector should the gas tube fail, e.g. because of a gas leak.

Novel modular arrangements embodying the foregoing for use in central office and residential applications are also illustrated.

9 Claims, 11 Drawing Figures

MULTI-FUNCTION FAIL-SAFE ARRANGEMENTS FOR OVERVOLTAGE GAS TUBES

BACKGROUND

Gas tube overvoltage protectors are widely used for the protection of equipment from overvoltage conditions which may be caused by lightning, power line contact, and the like.

It is also a widely practiced technique to associate various fail-safe arrangements with such tubes and with other types of protectors, e.g. air gap arrestors, to meet various contingencies. For example, the presence of a sustained overload, as where a power line has come in permanent contact with a protected telephone line, produces a concomitant sustained ionization of the gas tube and the resultant passage of heavy currents through the tube. Such currents will in many cases destroy the overvoltage protector and may also constitute a fire hazard.

One approach to this problem involves the association of the gas tube with serially connected fusible elements such that a sustained overload disconnects both the protected device and the protected circuit from the source experiencing the overvoltage condition. (Other arrangements disconnect only the protected circuit, or only the arrestor.)

Another common approach is to employ fusible elements which fuse in the presence of such overloads and provide either a permanent short circuiting of the arrestor directly, or function to trigger another mechanism, e.g. a spring loaded shorting bar, which provides the short circuit connection (generally, the arrestor electrodes are both shorted and grounded). The presence of the permanent short and ground condition serves to flag attention to the fact that the protector has failed or was in a failure mode, thus signalling the need for its inspection or replacement. Examples of this type of fail-safe protection are found in U.S. Pat. Nos. 3,281,625, 3,340,431 and 3,522,570. Of particular relevance to the invention herein is U.S. Pat. No. 3,896,343 which illustrates the use of fusible rings or sleeves on the casing of the gas tube to provide the fail-safe function.

Protector circuits are subject to other types of contingencies as well, including gas tube failure, e.g. by reason of gas leakage. To deal with this possibility, it is a widely practiced technique to combine the gas tube protector with backup protection so that the equipment remains protected in the event the tube fails (becoming an open circuit; a failure producing a short nullifies the protection of the backup gap). Such backup protection is often a requirement specified by utilities such as telephone companies for protectors associated with their equipment.

The fail-safe and backup arrangements described above are also combined in certain gas tube protector units so that there is both fail-safe fusible type protection as well as backup gap protection. One example of such an arrangement is found in U.S. Pat. No. 3,254,179. It is with this combined protection that the invention herein is concerned.

OBJECTS

It is an object of the invention to provide a circuit protector which provides conventional gas tube protection combined with fusible fail-safe (short) and backup gap protection in a configuration which is extremely simple, compact, inexpensive, reliable and of long term durability, and which by reason of these attributes is well suited for many applications including both central office, and residential utilization.

SUMMARY

Other objects and advantages will be apparent in the following description and in the practice of the invention which may be summarized as a protector comprising:

1. a gas tube having a least one electrode in a gas filled housing which includes a conductive section for connection to ground, and insulated therefrom another section electrically connected to the electrode, and
2. fusible means oriented relative to said two housing sections and configured to
   - i. define backup air gap means across said sections, and
   - ii. in the event of a sustained overload, to provide a conductive path shorting said two sections.

DRAWINGS

Illustrating exemplary embodiments of the invention are the drawings of which:

DETAILED DESCRIPTION OF THE INVENTION

Figure 1:
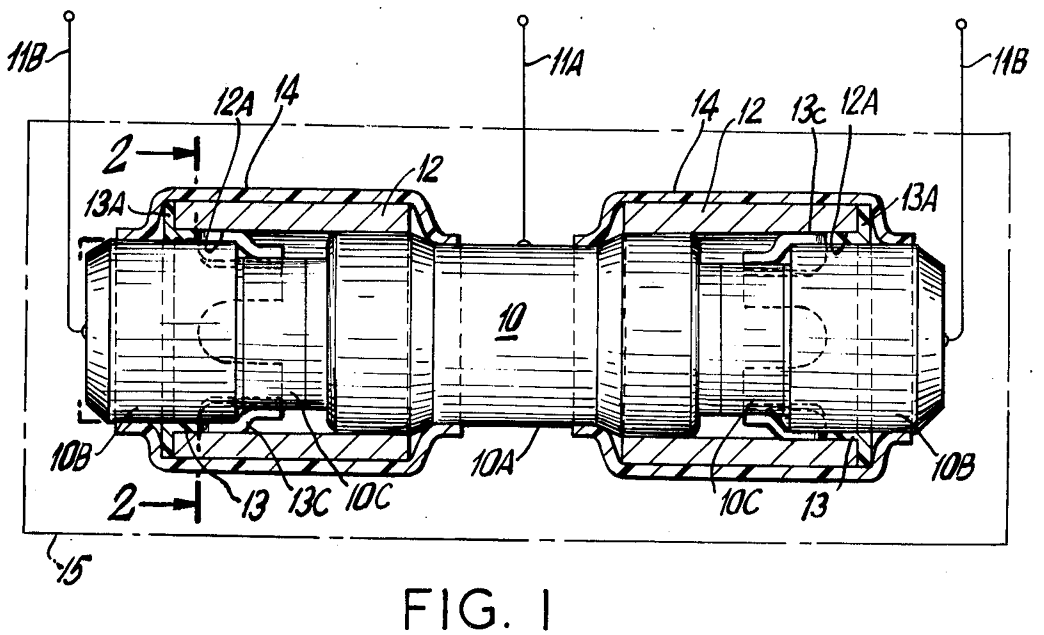
FIG. 1 is an elevational view, partly in section and partly schematic, of a first embodiment.
Figure 2:
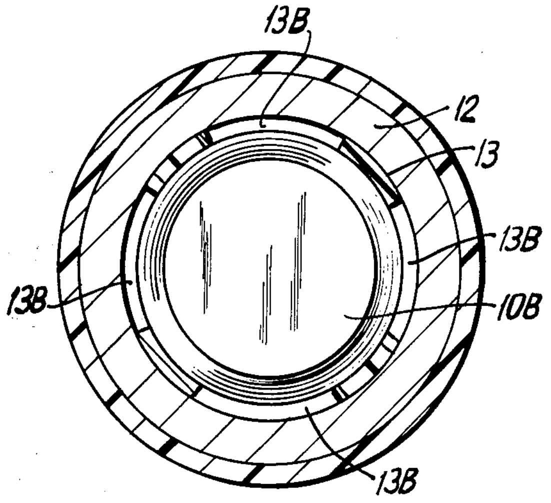
FIG. 2 is a cross-sectional view taken along the lines 2—2 of FIG. 1.

In the embodiment illustrated in FIGS. 1 and 2 a gas tube 10 is provided, the tube including a center body 10A and electrode end caps 10B each separated from the center body 10A by a respective insulated sleeve section 10C.

The arrestor 10, which is of known construction and may comprise for example TII Model 31, has each of its end electrodes extending inwardly from the respective end cap 10B toward the center of the tube to define a gap (not shown) between the electrodes. Spacing and dimensions are such that each electrode also forms a gap (not shown) with the center body conductive casing section 10A.

The tube is filled with a gas and the electrode end caps 10B are each provided with a lead 11B for connection to the circuit to be protected. Center body 10 is likewise provided with a lead 11A for connection to ground.

In the presence of overvoltage conditions the gas in tube 10 ionizes thereby creating in known manner, conductive shunting paths between each line of the protected circuit and ground (via the respective terminal lead 11B and ground lead 11A).

FAIL-SAFE AND BACKUP FEATURES

At each end of tube 10 there is provided an annular member or sleeve 12 of fusible material, the inner portion of which is in electrical contact with center body 10, and the outer portion of which is telescopically fitted on a respective annular insulator-spacer 13. The latter is coaxially disposed on the respective end cap 10B. Overlying and sealing these components are respective sleeves 14 preferably of the heat-shrink type.

Each spacer 13 includes a radial flange portion 13A which is in abutting relationship with the outer rim of the respective fusible sleeve 12; each spacer also includes a series of slots or cut outs 13B in the skirt portions 13C of the spacer as also illustrated in FIG. 2. These slots in the periphery of the spacer define air gaps which are further defined and bounded at one end by sections 12A of each fusible ring 12 which coincide with the cut out portions of the spacers and at the other end by the corresponding exposed areas of the respective opposing sections of end cap 10B. Accordingly, there is provided a series of air gaps annularly disposed around the periphery of the gas tube at each end thereof, the gaps of each set being defined by the exposed sections of the fusible sleeve 12, and the opposing sections of the respective end caps.

By way of example, the gap so defined may be in the order of 0.010 inches in a case where tube 10 is rated to ionize at 500 volts. Under these circumstances, the failure of tube 10, as for example by way of the loss of gas therein, will not cause loss of protection as the air gaps will provide backup protection producing a protective discharge when overvoltage conditions in excess of 1000 volts occur. The circuit parameters for particular applications are selected such that while the air gap strikes at a higher voltage than the gas tube, that higher voltage is nevertheless below the value of voltage which will damage the protected circuit.

With respect to the fail-safe function, a sustained overvoltage condition sufficient to cause the fusing of each fusible ring 12, results in the creation of a fused path of conductive material from the respective end cap 10B to center body 10. Again, by way of example, the fusible sleeves 12 may be fabricated from appropriate tin-lead alloys designed to fuse in the presence of excessive overloads.

It is important to prevent the contamination of air gap spaces and pressure contact locations from the adverse effects of moisture and other environmental factors. To that end the protector of FIGS. 1 and 2 may be enclosed within an essentially moisture proof enclosure as schematically illustrated at 15, in those cases where the heat shrink sleeves 14 are not employed or do not provide the requisite sealing effect. Alternatively or additionally, spacers 13 may be utilized to provide the requisite sealing.

Figure 3:
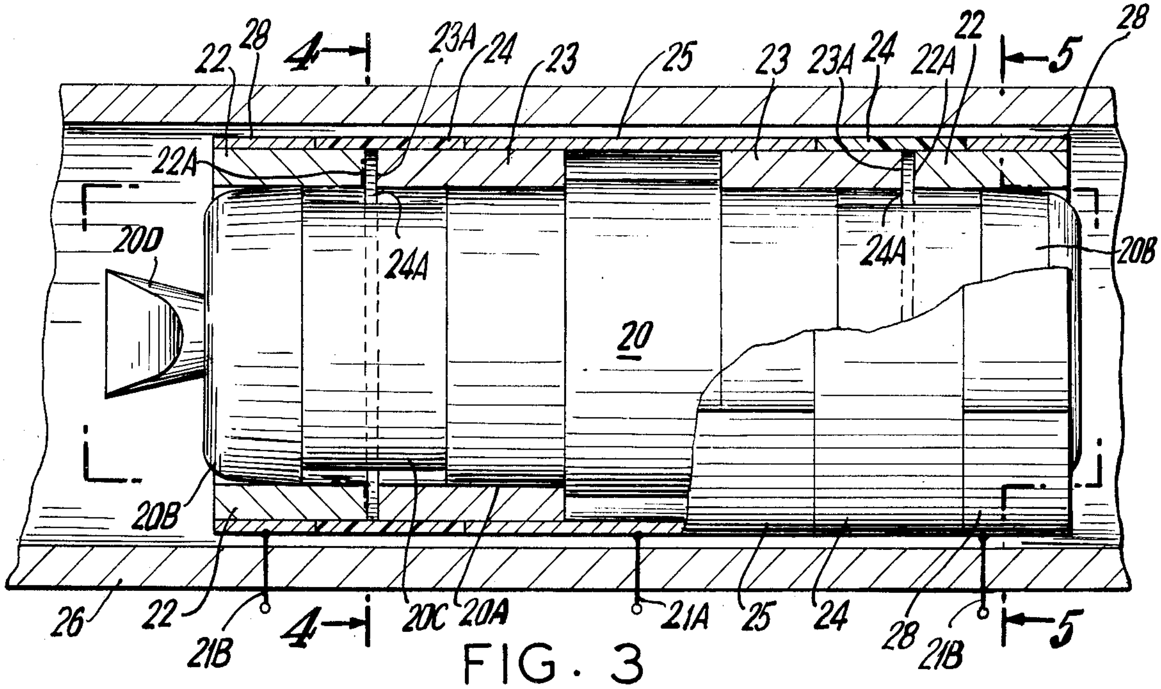
FIG. 3 is an elevational view, partly in section and partly schematic, of a second embodiment.
Figure 4:
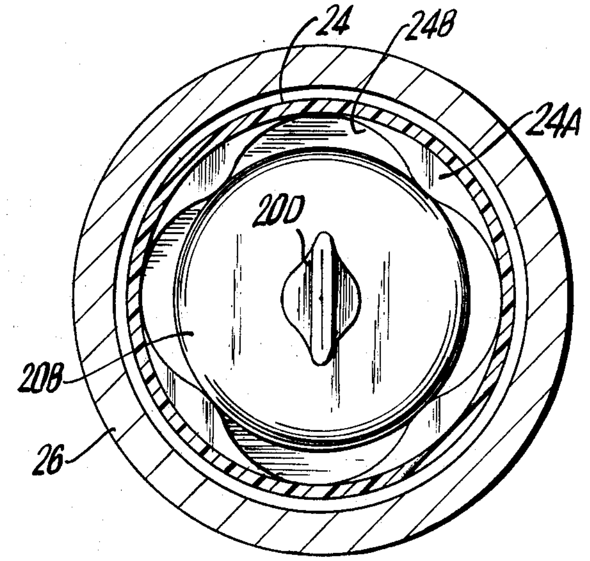
FIG. 4 is a cross-sectional view taken along lines 4—4 of FIG. 3.
Figure 5:
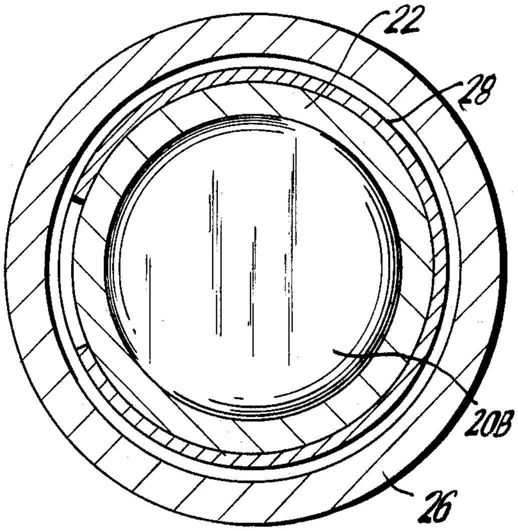
FIG. 5 is a cross-sectional view taken along lines 5—5 of FIG. 3.

Turning now to the embodiment illustrated in FIGS. 3-5, there is illustrated therein a gas tube 20 of known configuration, e.g. TII Model 16 or 21, the casing of which includes conductive center body 20A, and electrode end caps 20B insulated therefrom by insulated sleeve sections 20C. A pinched fill tube 20D is provided at one end of the arrestor. As with the previously described embodiment, end caps 20B are electrically connected to electrodes which extend axially into the gas filled interior of the tube to define a gap between the electrodes and a gap between each electrode and the center body 20A.

In the embodiment of FIGS. 3, 4 and 5, there is fitted on each end cap 20B a fusible annular ring or sleeve 22 which illustratively may be of tin-lead alloy composition and which is in electrically conductive contact with the respective electrode via the associated end cap.

Coaxially aligned with each fusible element 22 is an opposing annular fusible member 23, illustratively of the same composition, and fitted to center body 20A and in electrical contact therewith. The sleeves 22 and 23 of each pair are separated a predetermined distance as defined by an insulatorspacer 24 which includes cut-out portions 24B in its radial flange section 24A to thereby define a gap between the opposing annular sleeves. Whereas in the embodiment of FIGS. 1 and 2, each air gap set is defined by its fusible ring and the respective end cap per se, in the embodiment of FIGS. 3, 4 and 5 two contiguous coaxial fusible sleeves electrically connected with the electrode and center casing respectively have their adjacent rims juxtaposed to define the poles of each set of backup air gaps.

As in the previously described embodiment, the fusible elements serve a fail-safe function as well; a sustained overvoltage condition of sufficient degree causes fusible sleeves 22 and 23 of each set to fuse in such a manner as to form a short circuit between the associated center body 20A and end cap 20B.

To provide circuit connections, a ground lead 21A is electrically connected as by soldering or welding to a clip 25 which resiliently engages the center body fusible sleeves 23, while clips 28, each having a lead 21B similarly connected thereto, resiliently engage respective end cap fusible sleeves 22 for connection to the protected lines.

It is preferred that the protector assembly of FIGS. 3–5 be enclosed within a suitable sealed housing 26 or be encapsulated to prevent the contamination of the backup air gaps, the electrical connection points, and the insulated sections.

CENTRAL OFFICE APPLICATION

Figure 6:
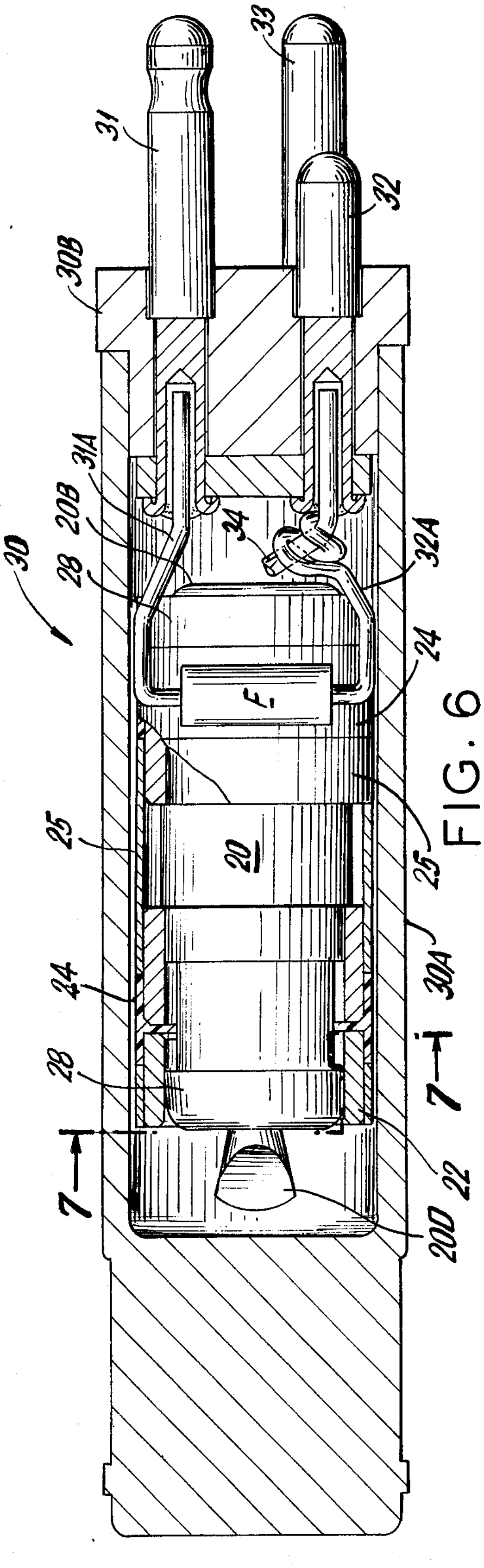
FIG. 6 is an elevational corss-sectional view of a modular form of the invention for use in central office applications.
Figure 7A:
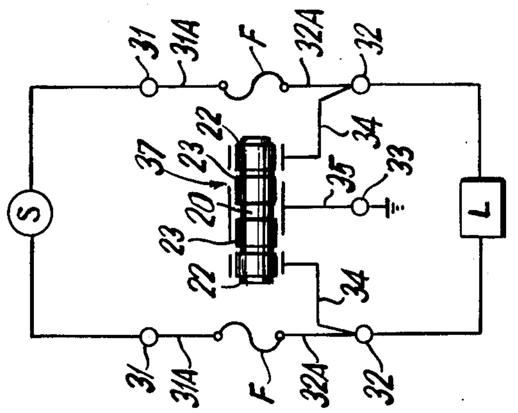
FIG. 7A is a schematic circuit diagram illustrating the circuit connection of the central office module.
Figure 7:
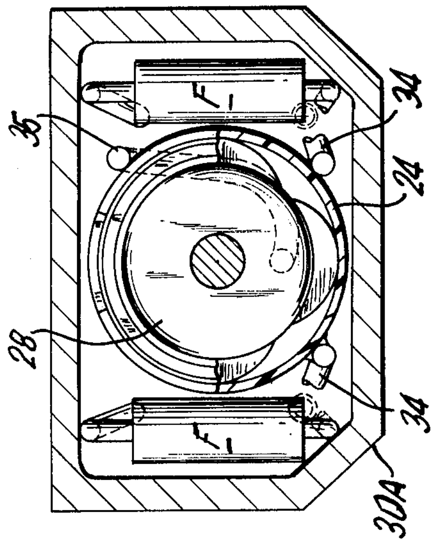
FIG. 7 is a cross-sectional view taken along lines 7—7 of FIG. 6.

An exemplary application of the foregoing protector arrangement is illustrated in FIGS. 6, 7 and 7A which describe a protector module particularly suited for central office applications. In this embodiment, the tube 20, the annular fusible sleeves 22 and 23, and the insulator-spacers 24, are of generally the same configuration and have the same function as the corresponding elements in the embodiment of FIGS. 3, 4 and 5. The same is true of the connector clips 25 and 28 for facilitating the connection of circuit leads to the tube by way of the fusible sleeves.

The assembly is housed in a module 30 formed of a cover assembly 30A which is telescopically fitted to a base 30B. The latter includes two long connector pins 31, two short pins 32 and a ground pin 33. The module also includes a pair of fuses F within its sealed enclosure.

Each fuse has one terminal connected by an associated lead 31A to a respective long pin 31 while the other terminal is connected via a lead 32A to a respective short pin 32 and also to a respective lead 34. The latter connects the associated pin 32 to its respective gas tube end cap 20B via the clip 28 and fusible sleeve 22 in contact therewith.

The connection of the fuses F to the protector 30, and their connection to the source S and to the protected circuit L are further illustrated in FIG. 7A. As seen therein, fuses F are connected serially in each leg of the lines interconnecting source S and load circuit L. The protector arrangement 30 including the tube 20, fusible elements 22, 23, which define backup air gaps symbolized by the reference 37, is connected such that the center body is grounded while the end electrodes of the gas tube are connected to the junction of respective fuse F and the terminal of load circuit L connected thereto. The backup gaps are each seen to be connected in parallel with the respective end electrode-center body gap.

So far as the protector arrangement 30 is concerned, it functions in the manner previously described. In addition, the system provides a fail-safe-open function by reason of fuses F which in the presence of potentially damaging sneak or other excessive currents, will open to thereby isolate both the protector and the circuit L from the source S.

STATION PROTECTOR

Figure 8:
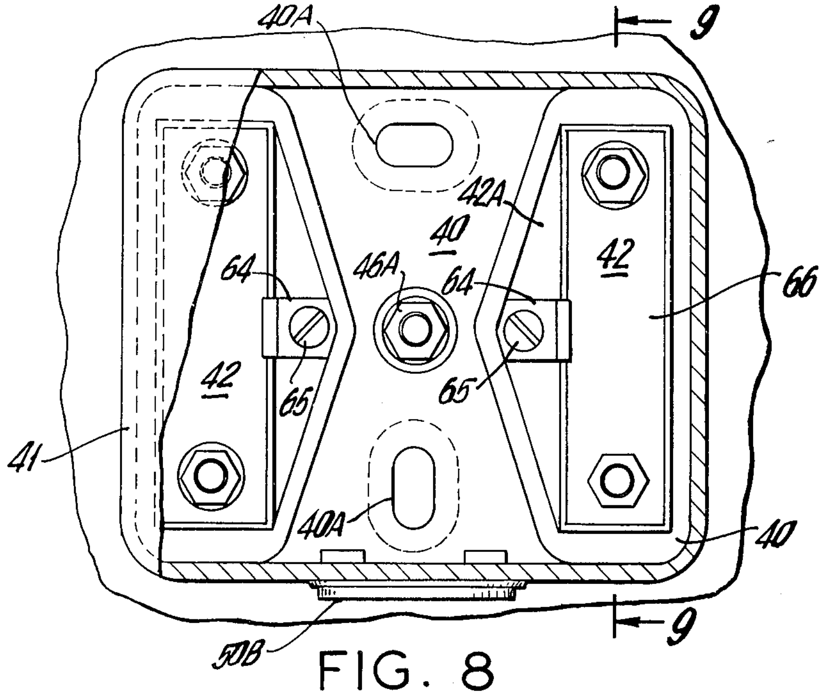
FIG. 8 is a plan, partly sectional, view of a modular form of the invention employed in a residential or station protector arrangement.
Figure 9:
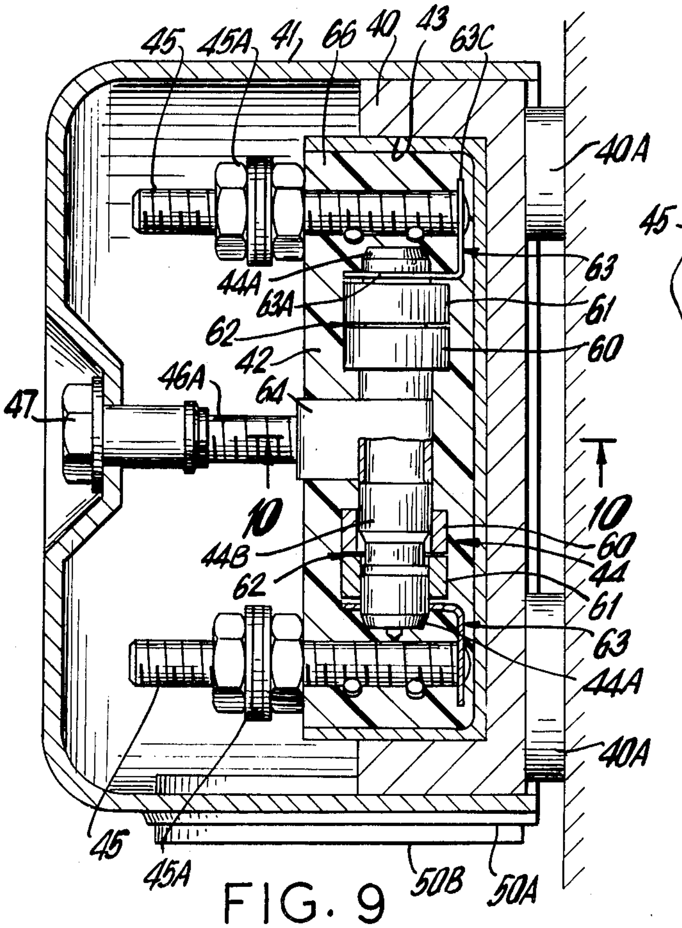
FIG. 9 is an elevational, partly sectional, view taken along lines 9—9 of FIG. 8.
Figure 10:
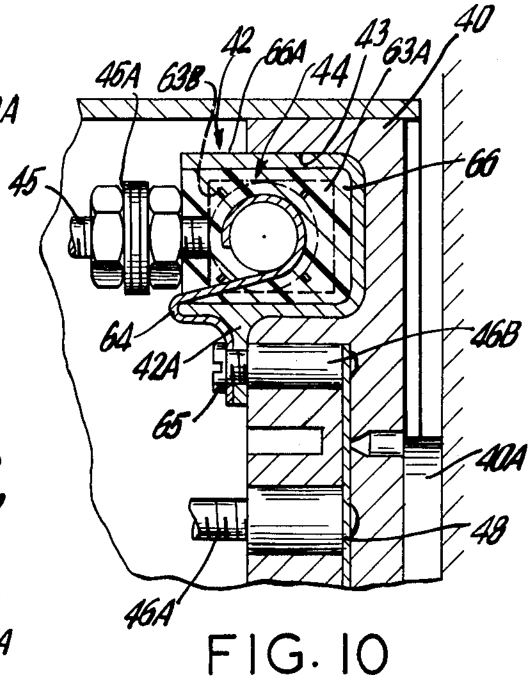
FIG. 10 is a fragmentary sectional view taken along lines 10—10 of FIG. 9.

Another application of the multi-function arrestor is shown in FIGS. 8, 9 and 10. In addition to its general utility, the protector assembly depicted therein is particularly adapted for protection of residential telephone equipment. While a dual station unit is illustrated, the disclosed techniques are applicable to single station applications as well.

The protector includes a base assembly 40 having mounting pads 40A for attaching the protector to an appropriate surface. Fitted to the base assembly is a cover assembly 41 which includes a captive cover nut 47 located to engage a threaded ground terminal 46A secured to the base assembly 40 and preferably molded therein. The cover assembly includes an opening 50A with grommet 50B through which the circuit lines to be protected are routed. This general organization of base and cover is well known and is illustrated in several of the previously cited patents.

Base assembly 40 includes a pair of module cavities 43 in which are removably inserted, module assemblies 42. Each module includes a flange section 42A having a connector strap 64 which is electrically and mechanically connected to the base 40 illustratively via a connector screw 65 which engages strap 64 with a ground terminal insert 46B. Each insert 46B is connected in turn to the end of a ground jumper 48, the center of which is connected to the ground terminal stud 46A. Thus, an external ground connection made to stud 46A, is conductively coupled to the center body of each protector module via the respective connector 64 which mounts on the upper face of the flange 42A.

Each module includes a gas tube assembly 44, e.g. TII Model 31, fitted at each end with a pair of fusible sleeves 60 and 61 connected respectively to center body 44B and end cap 44A whereby the air gaps 62 are formed between the members 60 and 61. As in previously described embodiments, the air gaps provide backup protection and fusible elements 60, 61 are further designed to fuse and form a short between center body 44B and end caps 44A in the presence of sustained overloads.

With respect to external circuit connections, the previously described ground connector 64 of each module is electrically and mechanically connected to center body 44B of the respective gas tube by way of the resilient clip end of connector 64 which partially encircles the center body.

The connections to the end caps 44A and their respective internal electrodes and air gap electrodes are provided by way of end coupling clips 63 having one section 63A bearing a cut out with slots 63B for pressure fitting over the respective end cap 44A, and another section 63C connected electrically and mechanically to the threaded terminal stud 45. Each stud is provided with a nut and washer assembly 45A to facilitate the connection of the external circuit lead to the respective module electrode.

All of the components of the protector module are preferably encapsulated in an encapsulating material 66 molded into the shell 66A which circumscribes the entire protector module except for the facing surface thereof. Insulator-spacers with cut outs, not shown, but employed in the manner described in connection with preceding embodiments, prevent the encapsulating material 66 from filling the air gaps defined by the fusible rings 60, 61.

In addition to the conventional arrestor functions and fail-safe and backup features previously described, the embodiment of FIGS. 7 through 9, in providing modules which are extremely simple, compact and inexpensive, facilitates a throw-away type of servicing. Thus, to service a residence at which one or both modules has failed, the serviceman need only remove the defective protector module from its circuit connections and base 40, and quickly substitute an operable replacement. The resultant saving of the serviceman's time can more than compensate for the possible difference in cost between an entire module assembly on the one hand or just the defective component thereof on the other. Furthermore, the defective modules can be collected and treated on a mass basis to recover salvageable components.

What is claimed is:

1. A unitary circuit breaker module having backup and fail-safe features comprising:

1. a gas tube surge arrestor containing a sealed gas filled ionizable gap defined by first and second sections of said tube, said sections being insulated from each other and at least one of said sections including an electrode;
2. backup air gap means connected in parallel with said ionizable gap and in thermally responsive relation thereto, said air gap means being dimensioned to provide backup protection for said ionizable gap;
3. said air gap means also including fusible means for shorting said ionizable gap in the event of a sustained surge.

2. A module as defined in claim 1 including means for sealably coupling said air gap means to said gas tube.

3. A module as defined in claim 1 in which said air gap means comprise an annular fusible sleeve in electrical and thermal contact with one of said sections and spaced a predetermined distance from the other of said sections to define an air gap.

4. A module as defined in claim 1 in which said air gap means comprise first and second fusible annular sleeves in thermal and electrical contact with said first and second sections respectively and coaxially spaced from each other to define said air gap therebetween.

5. A module as defined in claim 1 including a fuse serially connected to one of said sections, said fuse being contained within said module.

6. A protector comprising the module as defined in claim 1 and a casing for mounting said module, said casing comprising at least one cavity for releasably containing said module and further including ground terminal means for supplying a ground connection to one of said sections of said module.

7. A module as defined in claim 1 in which said arrestor includes a third section of said tube including an electrode whereby said tube comprises a three element arrestor having at least one additional ionizable gap defined by said third section and one of said first and second sections and wherein said backup air gap means include air gaps connected in parallel with each of said ionizable gaps.

8. A module as defined in claim 1 in which said fusible means comprise at least one pole piece of said air gap means.

9. A module as defined in claim 1 in which said backup air gap means include at least one fusible pole face electrically and thermally connected to one of said sections and an electrical insulator for electrically insulating said pole face from the other of said sections and having portions defining said air gap.

* * * * *